United States Patent
Wan et al.

(10) Patent No.: US 10,705,205 B2
(45) Date of Patent: Jul. 7, 2020

(54) GROUND-BASED INTERFEROMETRIC SYNTHETIC APERTURE RADAR-BASED ATMOSPHERIC PHASE COMPENSATION METHOD

(71) Applicant: University of Electronic Science and Technology of China, Chengdu (CN)

(72) Inventors: Qun Wan, Chengdu (CN); Yue Yang, Chengdu (CN); Zhenzhu Zha, Chengdu (CN); Jihao Yin, Chengdu (CN); Lin Zou, Chengdu (CN); Jie Zhuang, Chengdu (CN); Xinyu Chen, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 212 days.

(21) Appl. No.: 16/012,791

(22) Filed: Jun. 20, 2018

(65) Prior Publication Data
US 2019/0353779 A1 Nov. 21, 2019

(30) Foreign Application Priority Data
May 15, 2018 (CN) .......................... 2018 1 0462268

(51) Int. Cl.
*G01S 13/90* (2006.01)
*G01S 7/35* (2006.01)

(52) U.S. Cl.
CPC .......... *G01S 13/9023* (2013.01); *G01S 7/354* (2013.01); *G01S 13/9011* (2013.01); *G01S 2007/356* (2013.01)

(58) Field of Classification Search
CPC ....... G01C 1/08; G01S 7/354; G01S 13/9011; G01S 13/9023; G01S 2007/356

(Continued)

(56) References Cited

U.S. PATENT DOCUMENTS

| | | | | |
|---|---|---|---|---|
| 5,923,278 | A * | 7/1999 | Poehler | G01S 13/9023 342/25 C |
| 6,011,505 | A * | 1/2000 | Poehler | G01S 13/9023 342/25 C |
| 7,236,646 | B1 * | 6/2007 | Horne | G06T 5/40 382/103 |

FOREIGN PATENT DOCUMENTS

| | | | |
|---|---|---|---|
| CN | 102955157 A * | 3/2013 | |
| CN | 106932777 A * | 7/2017 | |
| EP | 2413158 B1 * | 8/2016 | ......... G01S 13/9023 |

* cited by examiner

*Primary Examiner* — Vladimir Magloire
*Assistant Examiner* — Monark Sharma
(74) *Attorney, Agent, or Firm* — Bayramoglu Law Offices LLC

(57) ABSTRACT

The present invention relates to the technical field of synthetic aperture radar, and in particular to a ground-based interference synthetic aperture radar-based atmospheric phase compensation method. The present invention first uses the inverse fast Fourier transform algorithm to rapidly and effectively realize the focusing in the range and cross-range dimension. Then a triple threshold method which combines coherence coefficient, amplitude, and amplitude dispersion index is used to select reliable PS points. Finally, under a full consideration of the spatial correlation of the atmospheric phase, the atmospheric phase is estimated by using a two-dimensional-polynomial model. The present invention can rapidly and accurately estimate and compensate the atmospheric phase, is helpful in improving the accuracy of GB-InSAR real-time measurement, and valuable and universal in practical application.

3 Claims, 3 Drawing Sheets

(58) Field of Classification Search
USPC .............................. 342/24, 25, 26; 382/103
See application file for complete search history.

GROUND-BASED INTERFEROMETRIC SYNTHETIC APERTURE RADAR-BASED ATMOSPHERIC PHASE COMPENSATION METHOD

CROSS REFERENCE TO RELATED APPLICATIONS

This application is based upon and claims priority to Chinese Patent Application No. CN2018104622685, field on May 15, 2018, the entire content of which is incorporated herein by reference.

TECHNICAL FIELD

The present invention relates to the technical field of synthetic aperture radar, and in particular to a ground-based interference synthetic aperture radar-based atmospheric phase compensation method.

BACKGROUND

Ground-based Interferometric Synthetic Aperture Radar (GB-InSAR) has been widely used in the field of deformation monitoring, such as landslide monitoring, glacier monitoring, and dam monitoring etc. GB-InSAR technology realizes high range resolution and cross-range resolution of radar image by stepped frequency continuous wave (SFCW) technology and synthetic aperture technology, respectively. Also, the GB-InSAR technology has the advantages of short revisiting time, flexible observation angle, and high stability of the sensor platform etc., so it has great application value in remote sensing deformation measurement. However, although the GB-InSAR measurement has high accuracy, it is easily disturbed by atmospheric phase screen (APS) or affected by system noise, and atmospheric disturbance has the greatest effect, such that the reliability and accuracy of deformation measurement will be seriously decreased. Therefore, it is necessary to compensate the atmospheric phase.

Existing APS estimation methods mainly include model-based methods and meteorological data methods. In the model-based methods, APS is usually modeled as a polynomial function of the distance, and is further estimated by using permanent scatterer (PS) technology, namely, the estimation is performed by selecting target points that can keep high correlation in a long period of time from the SAR images, or manually setting ground control points (GCPs). However, in fact, the atmospheric phase is not only a function of distance, but also a function of cross-range. In the meteorological data methods, the estimation of APS is performed according to the measured atmospheric parameters such as temperature, humidity, and pressure etc. The estimation performance of the meteorological data method depends on the accuracy of the meteorological data measurement, and when the atmospheric parameters change greatly along the monitoring scene, such method is no longer applicable.

SUMMARY

The objective of the present invention is to provide a new GB-InSAR-based atmospheric phase compensation method to solve the above-mentioned problems.

The technical solution of the present invention is as follows. A GB-InSAR-based atmospheric phase compensation method includes the following steps.

a. Imaging processing: because SFCW technique is used, a range compression can be transformed from a frequency domain to a spatial domain by an inverse fast Fourier transform algorithm. From the other aspect, since the sampling of different observation points in GB-SAR along the linear rail can be regarded as a frequency domain sampling with a linear frequency shift, the cross-range focusing can be realized by the inverse fast Fourier transformation as well. To reduce the side lobes, a window function can be applied after focusing to obtain the final two-dimensional SAR image.

b. Image registration: the two-dimensional SAR images obtained by continuous observations are sequentially registered. To perform the image registration, the transformation from the slave image S geometry to the master image M geometry has to be found and then the slave image S has to be resampled to the master image M geometry, which specifically includes the following steps.

b1. Image matching: a series of pixel points (x,y) are selected from the master image M, and a shift $k_{xy}=(k_x,k_y)$ of the image in a range direction and a cross-range direction is estimated according to a cross-correlation function $C(k_{xy})$ of the square of amplitude values of two images. The cross-correlation function $C(k_{xy})$ is expressed as follows:

$$C(k_{xy}) = \frac{\sum_{i,j \in H_{xy}}[M(i,j)-\mu_M][S(i-k_x, j-k_y)-\mu_S]}{\sigma_M \sigma_S} \quad \text{(formula 1)}$$

In formula 1, $H_{xy}$ represents a window function, and $\mu_M$, $\mu_S$, $\sigma_M$, $\sigma_S$ represent the mean value and variance of the images in the window, respectively. The maximum value of the cross-correlation function $C(k_{xy})$ is used to represent the shift $k_{xy}=(k_x,k_y)$ between the two images.

b2. Transformation estimation: transformation parameters $p_x(x,y), p_y(x,y)$ between the two images are estimated by the following two dimensional-polynomial:

$$\begin{cases} p_x(x,y) = a_x + b_x x + c_x y + d_x x^2 + e_x xy + f_x y^2 \\ p_y(x,y) = a_y + b_y x + c_y y + d_y x^2 + e_y xy + f_y y^2 \end{cases} \quad \text{(formula 2)}$$

where, $a_x$, $b_x$, $c_x$, $d_x$, $e_x$, $f_x$ and $a_y$, $b_y$, $c_y$, $d_y$, $e_y$, $f_y$ are estimated by the least squares method. The observation model is:

$$\begin{cases} x_S = x_M + p_x(x,y) + \xi_x \\ y_S = y_M + p_y(x,y) + \xi_y \end{cases} \quad \text{(formula 3)}$$

In formula 3, $(x_S, y_S)$ is a coordinate on the slave image corresponding to the point $(x_M, y_M)$ on the master image, and $(\xi_x, \xi_y)$ is the residual observation error. The representation of the shift $(k_x, k_y)$ obtained is expressed as follows:

$$\begin{cases} k_x = p_x(x,y) + \xi_x \\ k_y = p_y(x,y) + \xi_y \end{cases} \quad \text{(formula 4)}$$

b3. Image resampling: in the present invention, a truncated Sinc interpolation is used, a truncated Sinc kernel size is a key parameter, and a typical interpolation kernel size is 8 pixels. The output of this step is the transformation from the slave image to the master image, namely, each pixel point of the master and slave images matches a same portion of a terrain of a measured area.

c. Interferometric phase filtering and phase unwrapping: performing a differential interference processing on the two images registered in step b to obtain an interference image. For GB-SAR system, an interference phase of the $\alpha^{th}$ pixel point in the interference image can be expressed as follows:

$$\Delta\psi_a = \Delta\psi_{def,a} + \Delta\psi_{atm,a} + \Delta\psi_{noise,a} + 2n\pi \quad \text{(formula 5)}$$

In formula 5, $\Delta\psi_{def,a}$ represents a phase caused by a deformation of target in two observations, $\Delta\psi_{atm,a}$ represents a phase difference caused by atmospheric factors in two observations, and $\Delta\psi_{noise,a}$ represents the phase difference caused by factors such as thermal noise etc. As a result of the periodicity of trigonometric function, the phase value of each point in the interference image can only fall within the range of principal value $(-\pi, \pi]$, i.e. wrapped phase, and the real interference phase is obtained by adding an integral multiple of $2\pi$ based on the wrapped phase, i.e. the constant n in calculation formula 5, so the real interference phase must be obtained by phase unwrapping. In the present invention, a minimum cost flow algorithm is used to perform the phase unwrapping operation. In order to ensure the quality of phase unwrapping, the periodic mean filtering method is used to filter out the interference of the noise before the phase unwrapping so as to make the interference phase clearer.

d. PS point selection: during the deformation monitoring of GB-SAR system in a long period of time, the scattering characteristics of many target points will change as a result of the effect of temporal decorrelation. Only the PS point can be used to perform an appropriate APS compensation. In the present invention, the PS point is selected by using the joint amplitude and amplitude dispersion index and coherence coefficient method. First, since the PS point needs to be updated, the SAR images are grouped during the processing, every F SAR images are set as a group, and a PS candidate selection is performed for each group. Then, the correlated coefficient information of all PS candidates is used to perform a secondary screening for PS candidates, and a final set of PS points is selected. Step d specifically includes the following steps.

d1. The PS candidate selection: the PS candidates are selected by using the amplitude and the index of amplitude dispersion.

d11. The PS candidates are selected by using the amplitude dispersion information. The calculation formula of amplitude dispersion is as follows:

$$\Upsilon_{amp} = \frac{\sigma_{amp}}{m_{amp}} \quad \text{(formula 6)}$$

In formula 6, $\sigma_{amp}$ represents a time sequential amplitude standard deviation of the target point, and $m_{amp}$ represents a time sequential amplitude average of the target point. In the process of amplitude dispersion selection, first, the amplitude dispersion threshold $\rho_{adi}$ is set, then pixel points having the amplitude dispersion less than the threshold $\rho_{adi}$ are selected as PS candidates.

d12. The PS candidates are further selected by using the amplitude information. In SAR images, there are some points having small amplitude dispersion and large phase error. Therefore, after the amplitude dispersion information is used to select, the amplitude information of the target point can be reused to select again. The amplitude selection method is expressed by a mathematical formula as follows:

$$\begin{cases} \beta \geq \beta_{thr}, \text{PS candidate} \\ \beta < B_{thr}, \text{reject point} \end{cases} \quad \text{(formula 7)}$$

In formula 7, $\beta$ is average amplitude information of the PS candidates selected according to the amplitude dispersion information in F images participating in the selection, and $\beta_{thr}$ represents the amplitude threshold. The quality of PS points can be further improved by the method of selecting again using the amplitude information.

d2. Secondary screening: the second screening is performed by using the coherence coefficient information. The coherence coefficient is an important index to evaluate the interferential phase accuracy of two SAR images. Therefore, PS candidates are subjected to the secondary screening according to the coherence coefficient information to select out the final set of PS points. The window with the size of $\xi \times \zeta$ is usually used to calculate the coherence coefficient. A mathematical expression of the coherence coefficient is as follows:

$$\gamma = \frac{\sum_{\xi}\sum_{\zeta} M \cdot S^*}{\sqrt{\sum_{\xi}\sum_{\zeta}|M|^2 \sum_{\xi}\sum_{\zeta}|S|^2}} \quad \text{(formula 8)}$$

The coherence coefficient of each PS candidate in a current image and a previous image is calculated, then all points having the coherence coefficient less than a threshold $\rho_{coh}$ are removed by setting the coherence coefficient threshold $\rho_{coh}$, the remaining PS candidates are final selection results of PS points.

e. Atmospheric phase compensation: the atmospheric phase is estimated by using a two-dimensional-polynomial model based on the PS points selected in step d. Since the APS is strongly correlated spatially, a two-dimensional-polynomial model with a transformation degree of r is established:

$$\Delta\psi_{atm}(p,q) = b_{00} + \sum_{t=0}^{r} b_{t,(r-t)} \cdot (p - p_{ref})^t \cdot (q - q_{ref})^{r-t} \quad \text{(formula 9)}$$

In formula 9, $\Delta\psi_{atm}$ represents the atmospheric phase, (p,q) represents a coordinate of a pixel point, $(p_{ref}, q_{ref})$ represents the coordinate of the reference pixel point, and $b_{t,(r-t)}$ represents a polynomial model parameter. The APS model parameter is estimated based on the PS points selected. Ideally, the deformation phase of the PS point selected is zero, so the following equation can be obtained:

$$\Delta\psi(p,q) = \Delta\psi_{atm}(p,q) + \Delta\psi_{noise}(p,q)$$

In the present invention, the model parameter $\hat{b}_{t,(r-t)}$ is estimated by the least squares method, then the atmospheric phase of the deformation area is calculated by using the estimated model parameter $\hat{b}_{t,(r-t)}$. After the atmospheric phase compensation, the true phase value caused by the deformation can be obtained, so that the deformation of the monitoring area can be calculated.

The above-mentioned GB-InSAR-based atmospheric phase compensation method is characterized in that in step d11, PS candidates are selected by using the amplitude dispersion information, and the amplitude dispersion threshold $\rho_{adi}$ is set as 0.1.

The above-mentioned GB-InSAR-based atmospheric phase compensation method is characterized in that in the secondary screening of step d2, the coherence coefficient threshold $\rho_{coh}$ is set as 0.9.

The present invention has the following advantages. In the GB-InSAR-based atmospheric phase compensation method of the present invention, first the inverse fast Fourier transform is used to realize the focusing in the range and cross-range dimension rapidly and effectively. Then a triple threshold method combining coherence coefficient, amplitude, and amplitude dispersion index is used to select reliable PS points. Finally, with a full consideration of the spatial correlation of the atmospheric phase, a 2D-polynomial model is used to estimate the atmospheric phase. The present invention can rapidly and accurately estimate and compensate the atmospheric phase, and is helpful in improving the real-time measurement accuracy of GB-InSAR, so it is valuable and universal in practical application.

DETAILED DESCRIPTION

The present invention will be further described below with reference to the drawings of the specification.

Figure 1:
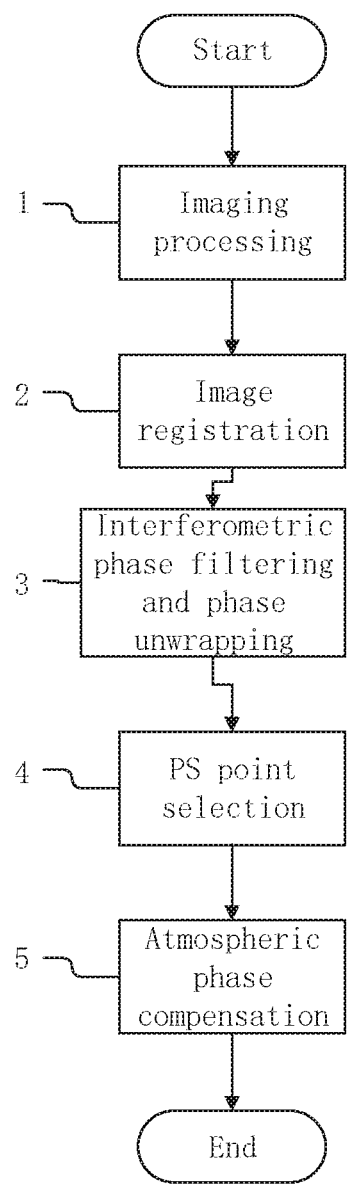
FIG. 1 is a flow chart of the present invention.

The processing flow chart of the GB-InSAR-based atmospheric phase compensation method is shown in FIG. 1. The processing flow consists of five steps: imaging processing, image registration, interferometric phase filtering and phase unwrapping, PS point selection, and atmospheric phase compensation, which are specifically described as follows.

Step(1), imaging processing: because SFCW technique is used, the range compression can be transformed from the frequency domain to the spatial domain by the inverse fast Fourier transform. From the other aspect, since the sampling of different observation points in GB-SAR along the linear rail can be regarded as the frequency domain sampling with a linear frequency shift, the cross-range focusing can be realized by the inverse fast Fourier transform as well. To reduce the side lobes, a window function can be applied after focusing to obtain the final two-dimensional SAR image. The optimal window function used in the present invention is the Hamming window:

$$W_{Hamming}(l,\alpha)=(1-\alpha)-\alpha\cos[2\pi l/(L-1)], 0 \le l \le L-1$$

L is the length of the window, and generally, the value of a is 0.46.

Step (2), image registration: the two-dimensional SAR images obtained by continuous observations are sequentially registered. To perform the image registration, the transformation from the slave image S geometry to the master image M geometry has to be found and then the slave image S has to be resampled to the master image M geometry, which specifically includes the following steps.

2.1) Image matching: a series of pixel points (x,y) are selected from the master image M, and the shift $k_{xy}=(k_x,k_y)$ of the image in range and cross-range direction is estimated according to the cross-correlation function $C(k_{xy})$ of the square of the amplitude values of the two images. The cross-correlation function $C(k_{xy})$ is expressed as follows:

$$C(k_{xy}) = \frac{\sum_{i,j \in H_{xy}}[M(i,j)-\mu_M][S(i-k_x,j-k_y)-\mu_S]}{\sigma_M \sigma_S}$$

where $H_{xy}$ represents a window function, and $\mu_M$, $\mu_S$, $\sigma_M$, $\sigma_S$ as represent the mean values and variances of images in the window, respectively. The maximum value of cross-correlation function $C(k_{xy})$ is used to represent the shift $k_{xy}=(k_x,k_y)$ between two images.

2.2) Transformation estimation: the transformation parameters $p_x(x,y), p_y(x,y)$ between two images are estimated by the following two dimensional-polynomial:

$$\begin{cases} p_x(x,y) = a_x + b_x x + c_x y + d_x x^2 + e_x xy + f_x y^2 \\ p_y(x,y) = a_y + b_y x + c_y y + d_y x^2 + e_y xy + f_y y^2 \end{cases}$$

where, $a_x$, $b_x$, $c_x$, $d_x$, $e_x$, $f_x$ and $a_y$, $b_y$, $c_y$, $d_y$, $e_y$, $f_y$ are estimated by the least squares method. The observation model is:

$$\begin{cases} x_S = x_M + p_x(x,y) + \xi_x \\ y_S = y_M + p_y(x,y) + \xi_y \end{cases}$$

where, $(x_S, y_S)$ is a coordinate on the slave image corresponding to the point $(x_M, y_M)$ on the master image, and $(\xi_x, \xi_y)$ is the residual observation error. The representation of the shift $(k_x, k_y)$ obtained is expressed as follows:

$$\begin{cases} k_x = p_x(x,y) + \xi_x \\ k_y = p_y(x,y) + \xi_y \end{cases}$$

2.3) Image resampling: in the present invention, the truncated Sinc interpolation is used, and the truncated Sinc kernel size is the key parameter. The typical interpolation kernel size is 8 pixels. The output of this step is the transformation from the slave image to the master image, namely, each pixel point of the master and slave images matches the same portion of terrain of the measured area.

Step (3), interferometric phase filtering and phase unwrapping: the differential interference processing is performed on the two images registered in step (2) to obtain an interference image. For GB-SAR system, the interference phase of the $\alpha^{th}$ pixel point in the interference image can be expressed as follows:

$$\Delta\psi_a = \Delta\psi_{def,a} + \Delta\psi_{atm,a} + \Delta\psi_{noise,a} + 2n\pi$$

where, $\Delta\psi_{def,a}$ represents the phase caused by the deformation of target in two observations, $\Delta\psi_{atm,a}$ represents the phase difference caused by atmospheric factors in two observations, and $\Delta\psi_{noise,a}$ represents the phase difference caused by factors such as thermal noise etc. As a result of the periodicity of trigonometric function, the phase value of each point in the interference image can only fall within the range of principal value $(-\pi, \pi]$, i.e. wrapped phase, and the real interference phase is obtained by adding an integral multiple of $2\pi$ based on the wrapped phase, namely, the constant n in the above-mentioned calculation formula, so the real interference phase must be obtained by phase unwrapping. In the present invention, a minimum cost flow algorithm is used to perform the phase unwrapping operation. In order to ensure the quality of phase unwrapping, the periodic mean filtering method is used to filter out the interference of the noise before the phase unwrapping so as to make the interference phase clearer.

Step (4), PS point selection: during the deformation monitoring of GB-SAR system in a long period of time, as a result of the effect of temporal decorrelation, the scattering characteristics of many target points will change. Only the PS point can be used to perform appropriate APS compensation. In the present invention, the PS points are selected by using the joint amplitude and amplitude dispersion index and coherence coefficient method. First, since the PS points need to be updated, SAR images are grouped during processing, every F SAR images are set as a group, and PS candidate selection is performed for each group. Then, the correlation coefficient information of all PS candidates is used to perform the secondary screening for PS candidates, and the final set of PS points is selected. Step 4 specifically the following steps.

4.1) PS candidate selection: the PS candidates are selected by using the amplitude and the index of the amplitude dispersion.

4.1.1) The PS candidates are selected by using the amplitude dispersion information. The calculation formula of amplitude dispersion is as follows:

$$\Upsilon_{amp} = \frac{\sigma_{amp}}{m_{amp}}$$

where $\sigma_{amp}$ represents the time sequential amplitude standard deviation of the target points, and $m_{amp}$ represents the time sequential amplitude average of the target points. In the process of amplitude dispersion selection, the amplitude dispersion threshold $\rho_{adi}$ is set first, then the pixel points having amplitude dispersion less than the threshold $\rho_{adi}$ are selected as PS candidates. In the GB-SAR data processing process, generally, the amplitude dispersion threshold $\rho_{adi}$ is set as 0.1.

4.1.2) The PS candidates are further selected by using the amplitude information to further select. In SAR images, there are points having small amplitude dispersion and large phase error. Therefore, after using amplitude dispersion information to select the PS candidates, the amplitude information of the target point can be reused to select again. The amplitude selection method is expressed by a mathematical formula as follows:

$$\begin{cases} \beta \geq \beta_{thr}, \text{PS candidate} \\ \beta < \beta_{thr}, \text{reject point} \end{cases}$$

where $\beta$ is the average amplitude information of the PS candidates selected according to the amplitude dispersion information in F images participating in the selection, and $\beta_{thr}$ is the amplitude threshold. The quality of PS points can be further improved by the method of selecting again using the amplitude information.

4.2) Secondary screening: the secondary screening is performed by using the coherence coefficient information. The coherence coefficient is an important index to evaluate the interferential phase accuracy of two SAR images. Therefore, the PS candidates are subjected to the secondary screening according to the coherence coefficient information, and the final set of PS points can be selected. The window with the size of $\xi \times \zeta$ is usually used to calculate the coherence coefficient. The mathematical expression of the coherence coefficient is as follows:

$$\gamma = \frac{\sum_{\xi}\sum_{\zeta} M \cdot S^*}{\sqrt{\sum_{\xi}\sum_{\zeta}|M|^2 \sum_{\xi}\sum_{\zeta}|S|^2}}$$

The coherence coefficients of each PS candidate in the current image and the previous image are calculated, then all points having the coherence coefficient less than the threshold $\rho_{coh}$ are removed by setting the coherence coefficient threshold $\rho_{coh}$, the remaining PS candidates are the results of the final selection of PS points. In general, the coherence coefficient threshold $\rho_{coh}$ of the highly-correlated PS points can be set as 0.9.

Step(5), atmospheric phase compensation: the atmospheric phase is estimated by using a two-dimensional-polynomial model based on the PS points selected in step (4). Since APS is strongly correlated spatially, a two-dimensional-polynomial model with a transformation degree of r is established:

$$\Delta\psi_{atm}(p, q) = b_{00} + \sum_{t=0}^{r} b_{t,(r-t)} \cdot (p - p_{ref})^t \cdot (q - q_{ref})^{r-t}$$

where $\Delta\psi_{atm}$ is the atmospheric phase, (p,q) is the coordinate of the pixel point, $(p_{ref}, q_{ref})$ is the coordinate of the reference pixel point, and $b_{t,(r-t)}$ is the polynomial model parameter. The APS model parameter is estimated based on the PS points selected. Ideally, the deformation phase of the PS point selected is zero, so the following equation can be obtained:

$$\Delta\psi(p,q) = \Delta\psi_{atm}(p,q) + \Delta\psi_{noise}(p,q)$$

In the present invention, the model parameter $\hat{B}_{t,(r-t)}$ is estimated by least squares method, and then the atmospheric phase of the deformation area is calculated by using the estimated model parameter $\hat{b}_{t,(r-t)}$. After the atmospheric phase compensation, the true phase value caused by the deformation can be obtained, so that the deformation of the monitoring area can be calculated.

EMBODIMENT

The parameters of GB-SAR system in this embodiment are set as Table 1 shown below.

TABLE 1

| System parameters | |
|---|---|
| Carrier frequency | 17.2 GHz |
| Bandwidth | 320 MHz |
| Synthetic aperture length | 0.85 m |
| Synthetic aperture time | 15 s |
| Spatial sampling interval | 0.005 s |
| Range resolution | 0.48 m |
| 3 dB antenna beam width | 45 degrees |

The experimental site is located in Yanguo Gorge, Yongjing County, Gansu Province of China. The observation time is from 17:30 PM on Apr. 1, 2017 to 17:30 PM on Apr. 2, 2017, 24 hours for total. The deformation monitoring processing of the measured data of the mountain is completed by using the GB-InSAR-based atmospheric phase compensation method of the present invention.

Figure 2:
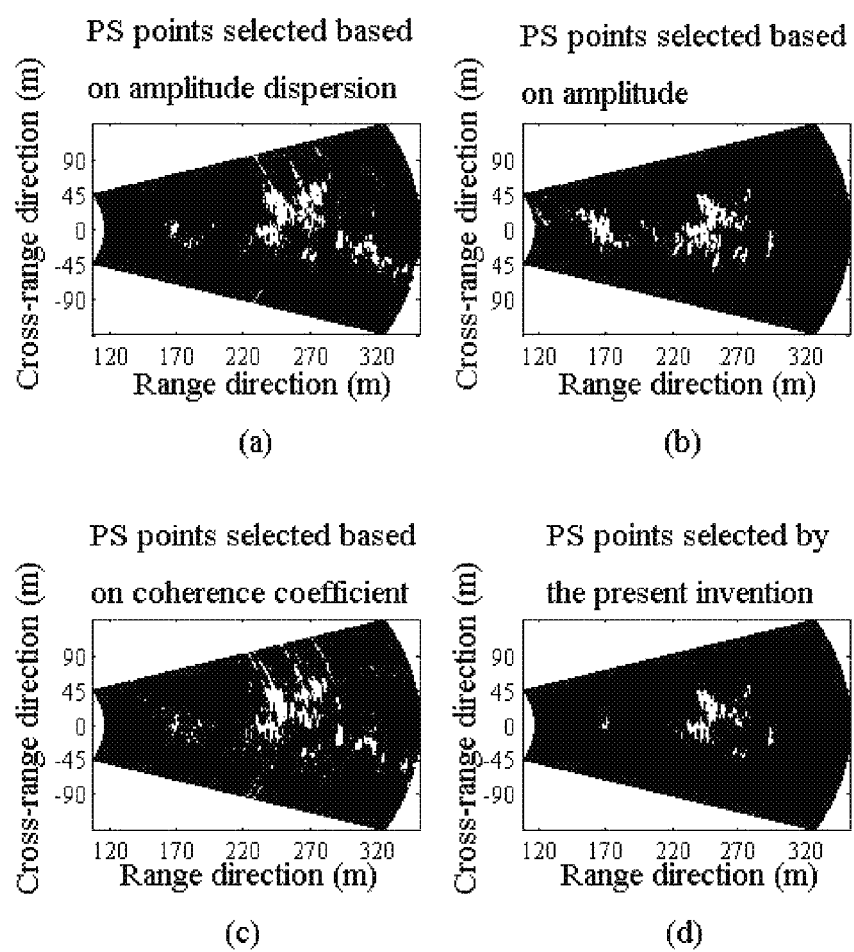
FIG. 2 shows the result of PS point selection of the data measured in Yanguo gorge, Yongjing County, Gansu province of China.
Figure 3:
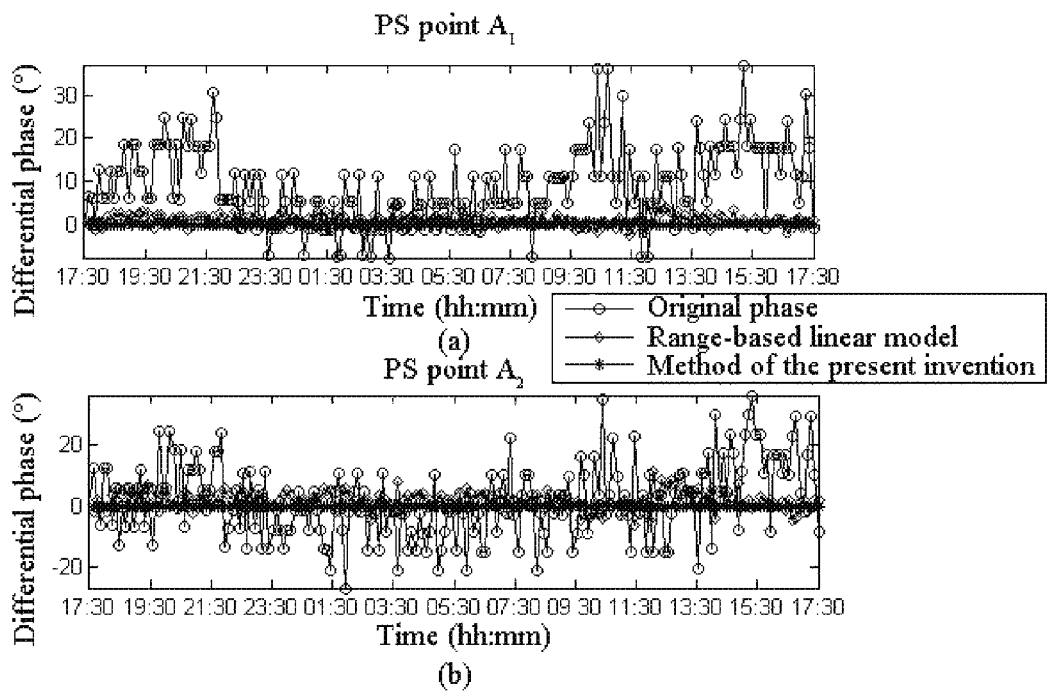
FIG. 3 shows the result of the data measured in Yanguo gorge Yongjing County, Gansu Province of China before and after the atmospheric phase compensation.
Figure 4:
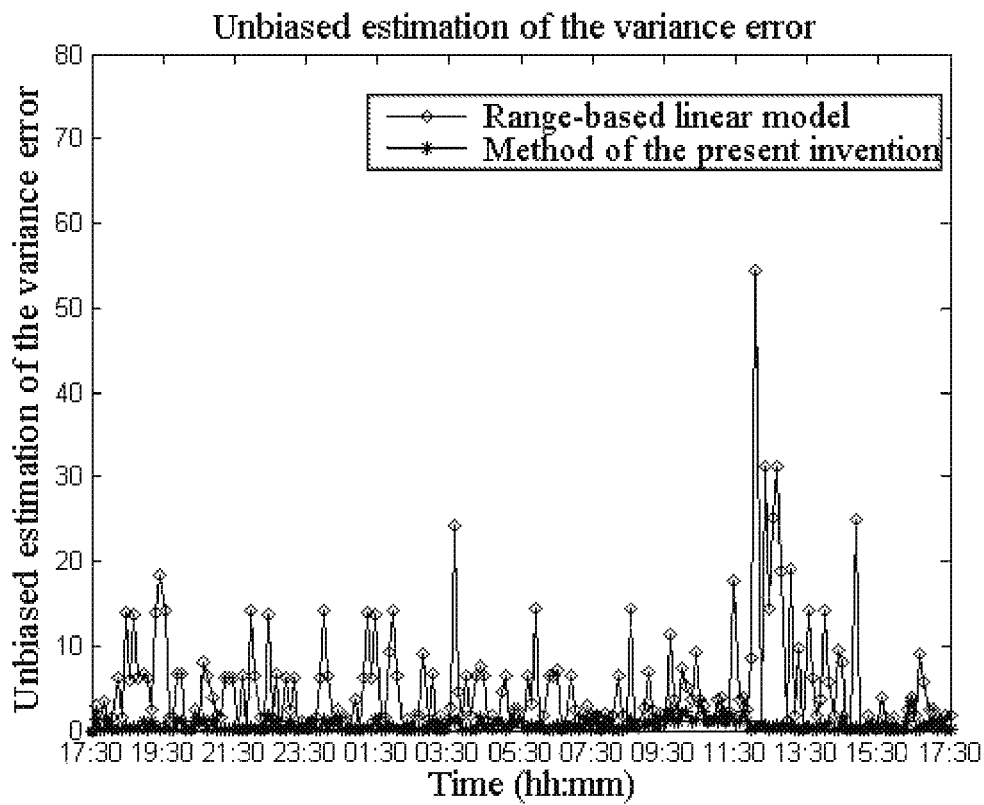
FIG. 4 shows the unbiased estimation result of the atmospheric phase variance error of the data measured in Yanguo gorge, Yongjing County, Gansu Province of China.

FIG. 2 shows the result of the PS points selected by using amplitude dispersion information, amplitude information, coherence coefficient information, and the joint triple threshold method of the present invention, respectively. Two PS points $A_1$, $A_2$ are selected to analyze the time sequential evolution of the differential phase before and after the atmospheric phase compensation, as shown in FIG. 3 (a) and FIG. 3 (b), respectively. The dot curve shows the time sequential evolution of the differential phase before the atmospheric phase compensation, the diamond curve shows the result after APS compensation using a range-based linear model, and the asterisk curve shows the result after atmospheric phase compensation using the method of the present invention. As one can tell from FIG. 3, the atmospheric phase can be more accurately estimated by the method of the present invention. The conclusion can also be further verified by the unbiased estimation of the variance error shown in FIG. 4. The unbiased estimation of the variance error is defined as: $S^2=(\Delta\Psi^\dagger\Delta\Psi-\Delta\Psi^\dagger_{atm}\Delta\Psi)/(\vartheta-3)$, wherein $\Delta\psi$ represents the original interference phase vector of PS point, $\Delta\psi_{atm}$ represents the estimated atmospheric phase vector of PS point, $\vartheta$ represents the number of PS points, and $\dagger$ represents the conjugate transpose operation. As one can tell from the result of this embodiment, the method of the present invention can realize the estimation and compensation of the atmospheric phase effectively, and has certain practicability.

To conclude, the above-mentioned embodiments are merely preferred embodiments of the present invention and not intended to limit the present invention. Any modification, equivalent substitution, and improvement derived without departing from the spirit and principle of the present invention shall be considered to fall within the scope of the present invention.

What is claimed is:

1. A ground-based interferometric synthetic aperture radar (GB-InSAR)-based atmospheric phase compensation method, comprising:
   a. imaging processing: setting as using a step frequency continuous wave (SFCW) technique, transforming a range compression from a frequency domain to a spatial domain by an inverse fast Fourier transform, regarding a sampling of different observation points in ground-based synthetic aperture radar (GB-SAR) along a linear rail as a frequency domain sampling with a linear frequency shift, performing cross-range focusing by the inverse fast Fourier transform as well, and adding windows to an image after focusing to obtain a final two-dimensional synthetic aperture radar (SAR) image;
   b. image registration: firstly, matching the final two-dimensional SAR images obtained by continuous observations; sequentially, finding out a transformation from a slave image S geometry to a master image M geometry; finally, resampling a slave image S to a master image M geometry, wherein step b specifically comprises:
   b1. image matching: selecting a series of pixel points (x,y) from the master image M, and estimating a shift $k_{xy}=(k_x,k_y)$ of the image in a range direction and a cross-range direction according to a cross-correlation function $C(k_{xy})$ of a square of amplitude values of the master image and the slave image, wherein the cross-correlation function $C(k_{xy})$ is expressed as follows:

$$C(k_{xy}) = \frac{\sum_{i,j \in H_{xy}} [M(i,j) - \mu_M][S(i-k_x, j-k_y) - \mu_S]}{\sigma_M \sigma_S} \quad \text{(formula 1)}$$

in formula 1, $H_{xy}$ represents a window function, $\mu_M$, $\mu_S$, $\sigma_M$, $\sigma_S$ represent mean values and variances of images in the window, respectively; the maximum value of the cross-correlation function $C(k_{xy})$ is used to represent the shift $k_{xy}=(k_x,k_y)$ between the master image and the slave image;

b2. transformation estimation: estimating transformation parameters $p_x(x,y), p_y(x,y)$ between the master image and the slave image by the following two-dimensional-polynomial:

$$\begin{cases} p_x(x,y) = a_x + b_x x + c_x y + d_x x^2 + e_x xy + f_x y^2 \\ p_y(x,y) = a_y + b_y x + c_y y + d_y x^2 + e_y xy + f_y y^2 \end{cases} \quad \text{(formula 2)}$$

wherein $a_x$, $b_x$, $c_x$, $d_x$, $e_x$, $f_x$ and $a_y$, $b_y$, $c_y$, $d_y$, $e_y$, $f_y$ are estimated by the least squares method, and an observation model is expressed as follows:

$$\begin{cases} x_S = x_M + p_x(x,y) + \xi_x \\ y_S = y_M + p_y(x,y) + \xi_y \end{cases} \quad \text{(formula 3)}$$

in formula 3, $(x_S, y_S)$ is a coordinate on the slave image corresponding to the point $(x_M, y_M)$ on the master image, and $(\xi_x, \xi_y)$ is a residual observation error; a representation of the shift $(k_x, k_y)$ obtained is expressed as follows:

$$\begin{cases} k_x = p_x(x,y) + \xi_x \\ k_y = p_y(x,y) + \xi_y \end{cases} \quad \text{(formula 4)}$$

b3. image resampling: using a truncated Sinc as an interpolation signal, transforming the slave image to the master image, namely, each pixel point of the master image and the slave image matches a same portion of a terrain of a measured area;
   c. interferometric phase filtering and phase unwrapping: performing a differential interference processing on the master image and the slave image registered in step b to obtain an interference image; for the GB-SAR system, an interference phase of an $\alpha^{th}$ pixel point in an interference image is expressed as follows:

$$\Delta\psi_a=\Delta\psi_{def,a}+\Delta\psi_{atm,a}+\Delta\psi_{noise,a}+2n\pi \quad \text{(formula 5)}$$

wherein in formula 5, $\Delta\psi_{def,a}$ represents a phase caused by a deformation of target in two observations, $\Delta\psi_{atm,a}$ represents a phase difference caused by atmospheric factors in the two observations, and $\Delta\psi_{noise,a}$ represents a phase difference caused by thermal noise factors;

a minimum cost flow algorithm is used for phase unwrapping, and a periodic mean filtering method is used to filter out an interference of noise before the phase unwrapping;

d. permanent scatterer (PS) point selection: grouping SAR images, wherein every F SAR images are set as a group and F denotes the number of SAR images; firstly, the PS candidate selection is performed by using amplitude and amplitude dispersion information of each group; secondly, a secondary screening is performed by using correlation coefficient information of all PS candidates and selecting out a final PS point set step d further comprises:

d1. PS candidate selection: selecting PS candidates by using an amplitude and an amplitude dispersion index;

d11. selecting the PS candidates by using amplitude dispersion information, wherein a calculation formula of an amplitude dispersion is as follows:

$$\Upsilon_{amp} = \frac{\sigma_{amp}}{m_{amp}} \quad \text{(formula 6)}$$

In formula 6, $\sigma_{amp}$ represents amplitude standard deviation of pixel point in F images, and $m_{amp}$ represents amplitude average of the pixel point in F images; in a process of an amplitude dispersion selection, an amplitude dispersion threshold $\rho_{adi}$ is set firstly, then pixel points having the amplitude dispersion less than the threshold $\rho_{adi}$ are selected as the PS candidates;

d12. further selecting the PS candidates by using the amplitude information, wherein an amplitude selection method is expressed by a mathematical formula as follows:

$$\begin{cases} \beta \geq \beta_{thr}, \text{PS candidate} \\ \beta < \beta_{thr}, \text{reject point} \end{cases} \quad \text{(formula 7)}$$

in formula 7, $\beta$ is average amplitude information of the PS candidates selected according to the amplitude dispersion information in F images participating in the selection, and $\beta_{thr}$ is an amplitude threshold;

d2. secondary screening: selecting a final PS point set by using coherence coefficient information of all PS candidates, and a mathematical expression of the coherence coefficient is as follows:

$$\gamma = \frac{\sum_{\xi}\sum_{\zeta} M \cdot S^*}{\sqrt{\sum_{\xi}\sum_{\zeta}|M|^2 \sum_{\xi}\sum_{\zeta}|S|^2}} \quad \text{(formula 8)}$$

in formula 8, $|\cdot|$ and $(\cdot)^*$ respectively represent modulus operation and conjugate operation, and $\xi\times\zeta$ denotes a size of a two-dimensional window function; pixel points having the coherence coefficient less than a threshold $\rho_{coh}$ are removed by setting the coherence coefficient threshold $\rho_{coh}$, and the remaining PS candidates are final selection results of PS points;

e. atmospheric phase compensation: estimating the atmospheric phase by using a two-dimensional-polynomial model based on the PS points selected in step d, and establishing a two-dimensional-polynomial model with a degree transformation of r:

$$\Delta\psi_{atm}(p,q) = b_{00} + \sum_{t=0}^{r} b_{t,(r-t)} \cdot (p-p_{ref})^t \cdot (q-q_{ref})^{r-t} \quad \text{(formula 9)}$$

wherein in formula 9, represents an atmospheric phase, (p,q) represents a coordinate of a pixel point, ($p_{ref},q_{ref}$) represents a coordinate of a reference pixel point, and $b_{t,(r-t)}$ represents a polynomial model parameter; an atmospheric phase screen (APS) model parameter is estimated based on the PS points selected, a deformation phase of the PS point selected is set as zero, so the following equation can be obtained:

$$\Delta\psi(p,q)=\Delta\psi_{atm}(p,q)+\Delta\psi_{noise}(p,q)$$

an estimated model parameter $\hat{b}_{t,(r-t)}$ is estimated by a least squares method, then the atmospheric phase of a deformation area is calculated by using the estimated model parameter $\hat{b}_{t,(r-t)}$; after the atmospheric phase compensation, a true phase value caused by deformation is obtained, so that a deformation of a monitoring area is calculated.

2. The GB-InSAR-based atmospheric phase compensation method according to claim 1, wherein in step d11, the PS candidates are selected by using the amplitude dispersion information, the amplitude dispersion threshold $\rho_{adi}$ is set as 0.1.

3. The GB-InSAR-based atmospheric phase compensation method according to claim 1, wherein in step d2, the coherence coefficient threshold $\rho_{coh}$ is set as 0.9 during the secondary screening.

\* \* \* \* \*